(12) United States Patent
Sodagar

(10) Patent No.: US 12,301,644 B2
(45) Date of Patent: May 13, 2025

(54) METHOD AND APPARATUS FOR THIRD PARTY REMOTE CONTROLLING OF UPLINK STREAMING IN 5G NETWORKS THROUGH APPLICATION INTERFACE

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/497,396

(22) Filed: Oct. 30, 2023

(65) Prior Publication Data

US 2024/0214440 A1 Jun. 27, 2024

Related U.S. Application Data

(60) Provisional application No. 63/434,400, filed on Dec. 21, 2022.

(51) Int. Cl.
| | | |
|---|---|---|
| *H04L 12/24* | (2006.01) | |
| *H04L 41/0803* | (2022.01) | |
| *H04L 65/1063* | (2022.01) | |
| *H04L 65/1069* | (2022.01) | |
| *H04L 65/612* | (2022.01) | |
| *H04L 65/613* | (2022.01) | |

(52) U.S. Cl.
CPC ........ *H04L 65/613* (2022.05); *H04L 65/1063* (2013.01); *H04L 65/1069* (2013.01); *H04L 65/612* (2022.05)

(58) Field of Classification Search
CPC ............... H04L 65/613; H04L 65/1063; H04L 65/1069; H04L 65/612
USPC ......................................................... 709/219
See application file for complete search history.

(56) References Cited

U.S. PATENT DOCUMENTS

| | | | | |
|---|---|---|---|---|
| 2021/0112439 | A1* | 4/2021 | Leung | H04L 65/1069 |
| 2021/0344998 | A1* | 11/2021 | Sodagar | H04L 65/765 |
| 2021/0352113 | A1* | 11/2021 | Sodagar | H04N 21/2225 |
| 2021/0360048 | A1* | 11/2021 | Sodagar | H04L 65/65 |
| 2022/0014799 | A1* | 1/2022 | Sodagar | H04N 21/2187 |
| 2022/0103601 | A1* | 3/2022 | Szucs | H04N 21/41407 |
| 2022/0182435 | A1 | 6/2022 | Sodagar | |

(Continued)

OTHER PUBLICATIONS

Written Opinion dated Jan. 25, 2024 of the International Searching Authority in Application No. PCT/US23/36361.

(Continued)

*Primary Examiner* — El Hadji M Sall
*Assistant Examiner* — Elizabeth Kassa
(74) *Attorney, Agent, or Firm* — Sughrue Mion, PLLC

(57) ABSTRACT

A method performed by at least one processor in a 5G media streaming uplink (5GMSu) application provider (AP), comprising: negotiating, by a 5GMSu AP with a 5GMSu aware application of a user equipment (UE) and a third-party remote controller, at least a communication protocol and a command dictionary for remote control of a 5GMSu session; executing and updating, by the 5GMSu AP, the UE with a service announcement; and transmitting, by the 5GMSu AP, remote control information to the third party remote controller, wherein the third-party remote controller sends a remote control command to the 5GMSu aware application in response to receiving the remote control information.

20 Claims, 6 Drawing Sheets

(56) References Cited

U.S. PATENT DOCUMENTS

| | | |
|---|---|---|
| 2022/0322306 A1 | 10/2022 | Sodagar |
| 2022/0322323 A1 | 10/2022 | Sodagar |
| 2022/0377389 A1 | 11/2022 | Sodagar |
| 2023/0239333 A1* | 7/2023 | Lo .......................... H04W 24/08 455/414.1 |

OTHER PUBLICATIONS

International Search Report dated Jan. 25, 2024 in Application No. PCT/US23/36361.
"3rd Generation Partnership Project; Technical Specification Group Services and System Aspects; 5G Media Streaming (5GMS); General description and architecture (Release 17)", 3GPP TS 26.501 V17.3.0, Sep. 2022, pp. 1-118.

* cited by examiner

METHOD AND APPARATUS FOR THIRD PARTY REMOTE CONTROLLING OF UPLINK STREAMING IN 5G NETWORKS THROUGH APPLICATION INTERFACE

CROSS-REFERENCE TO RELATED APPLICATION

This application claims priority from U.S. Provisional Application No. 63/434,400, filed on Dec. 21, 2022, in the United States Patent and Trademark Office, the disclosure of which is incorporated herein by reference in its entirety.

FIELD

The disclosure generally relates to $5^{th}$ generation (5G) media streaming (5GMS), and, in particular, to a method and apparatus for configuring 5G application servers in connected uplink-to-downlink streaming.

BACKGROUND

The 3rd Generation Partnership Project (3GPP) TS26.512 defines the concept of uplink streaming where the content is streamed from a device to an external service provider. This standard also defines a remote-control option for controlling uplink streaming. However, existing streaming architecture does not provide or define how a remote control is used by another UE or a network element.

SUMMARY

According to one or more embodiments, A method performed by at least one processor in a 5G media streaming uplink (5GMSu) application provider (AP), comprising: negotiating, by a 5GMSu AP with a 5GMSu aware application of a user equipment (UE) and a third-party remote controller, at least a communication protocol and a command dictionary for remote control of a 5GMSu session; executing and updating, by the 5GMSu AP, the UE with a service announcement; and transmitting, by the 5GMSu AP, remote control information to the third party remote controller, wherein the third-party remote controller sends a remote control command to the 5GMSu aware application in response to receiving the remote control information.

According to one or more embodiments, a method performed by a 5G media streaming uplink (5GMSu) aware application of a user equipment (UE), the method comprising: negotiating, with a 5GMSu application provider (AP) and a third-party remote controller, at least a communication protocol for an 5GMSu session and a command dictionary for remote control of the 5GMSu session; receiving, from the 5GMSu AP, a service announcement that includes remote control information; and receiving, from the third-party remote controller, a remote control command based on the remote control information.

According to one or more embodiments, a 5G media streaming uplink (5GMSu) application provider (AP) server, comprising: at least one memory configured to store program code; and at least one processor configured to read the program code and operate as instructed by the program code, the program code including: negotiating code configured to cause the at least one processor to negotiate, with a 5GMSu aware application of a user equipment (UE) and a third-party remote controller, at least a communication protocol and a command dictionary for remote control of a 5GMSu session; executing code configured to cause the at least one processor to execute and update, the UE with a service announcement; and transmitting code configured to cause the at least one processor to transmit, remote control information to the third party remote controller, wherein the third-party remote controller sends a remote control command to the 5GMSu aware application in response to receiving the remote control information.

According to one or more embodiments, a user equipment (UE) executing a 5G media streaming uplink (5GMSu) aware application, the UE comprising: at least one memory configured to store program code; and at least one processor configured to read the program code and operate as instructed by the program code, the program code including: negotiating code configured to cause the at least one processor to negotiate, with a 5GMSu application provider (AP) and a third-party remote controller, at least a remote communication protocol for an 5GMSu session a command dictionary for remote control of the 5GMSu session; first receiving code configured to cause the at least one processor to receive, from the 5GMSu AP, a service announcement that includes remote control information; and receiving, from the third-party remote controller, a remote control command based on the remote control information.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
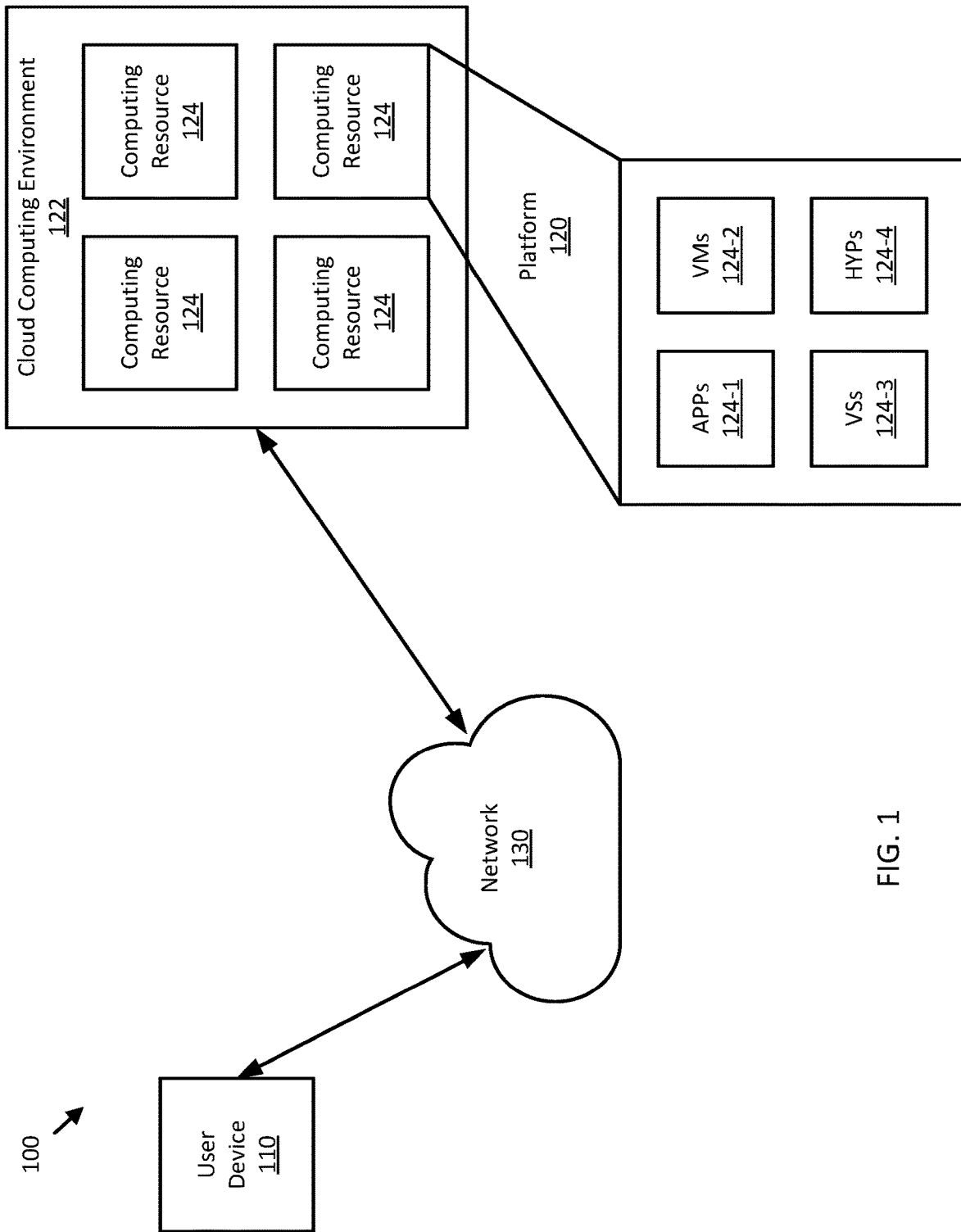
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g.

the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
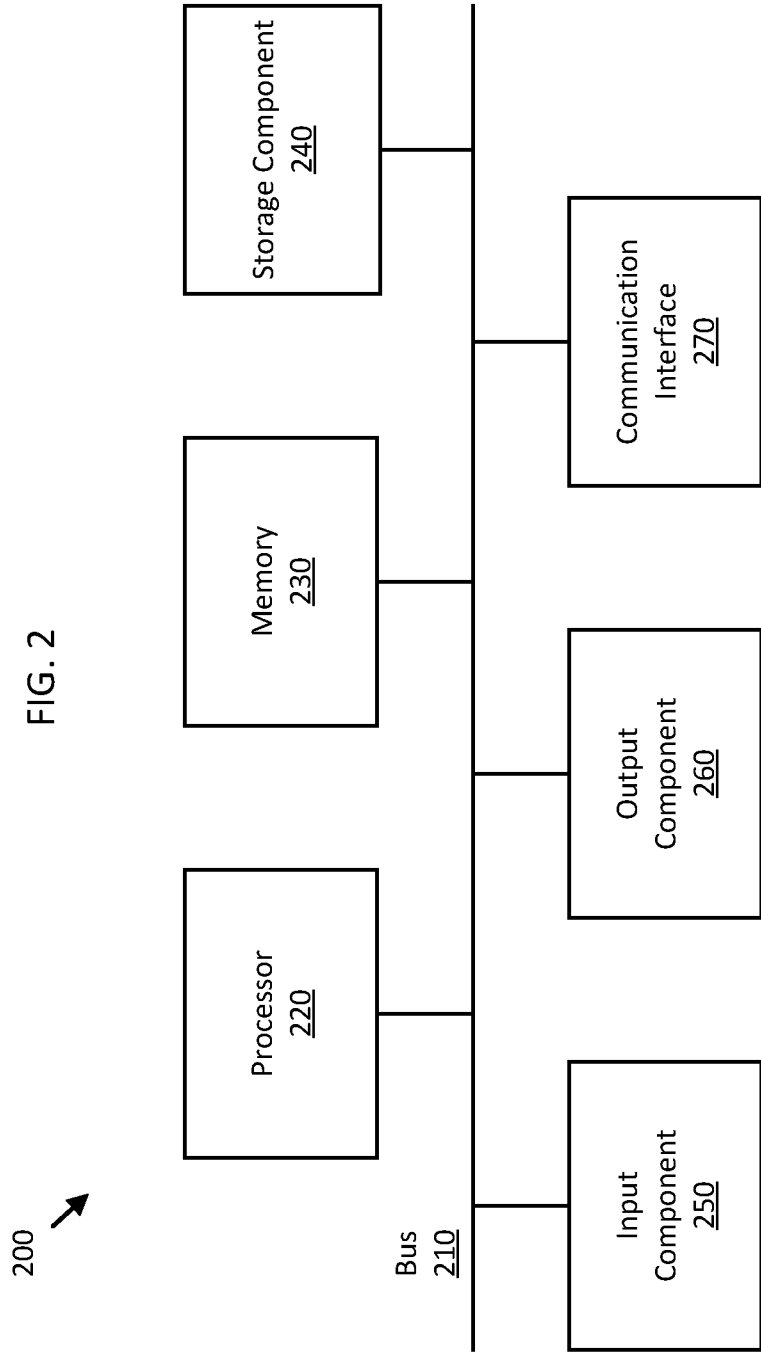
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
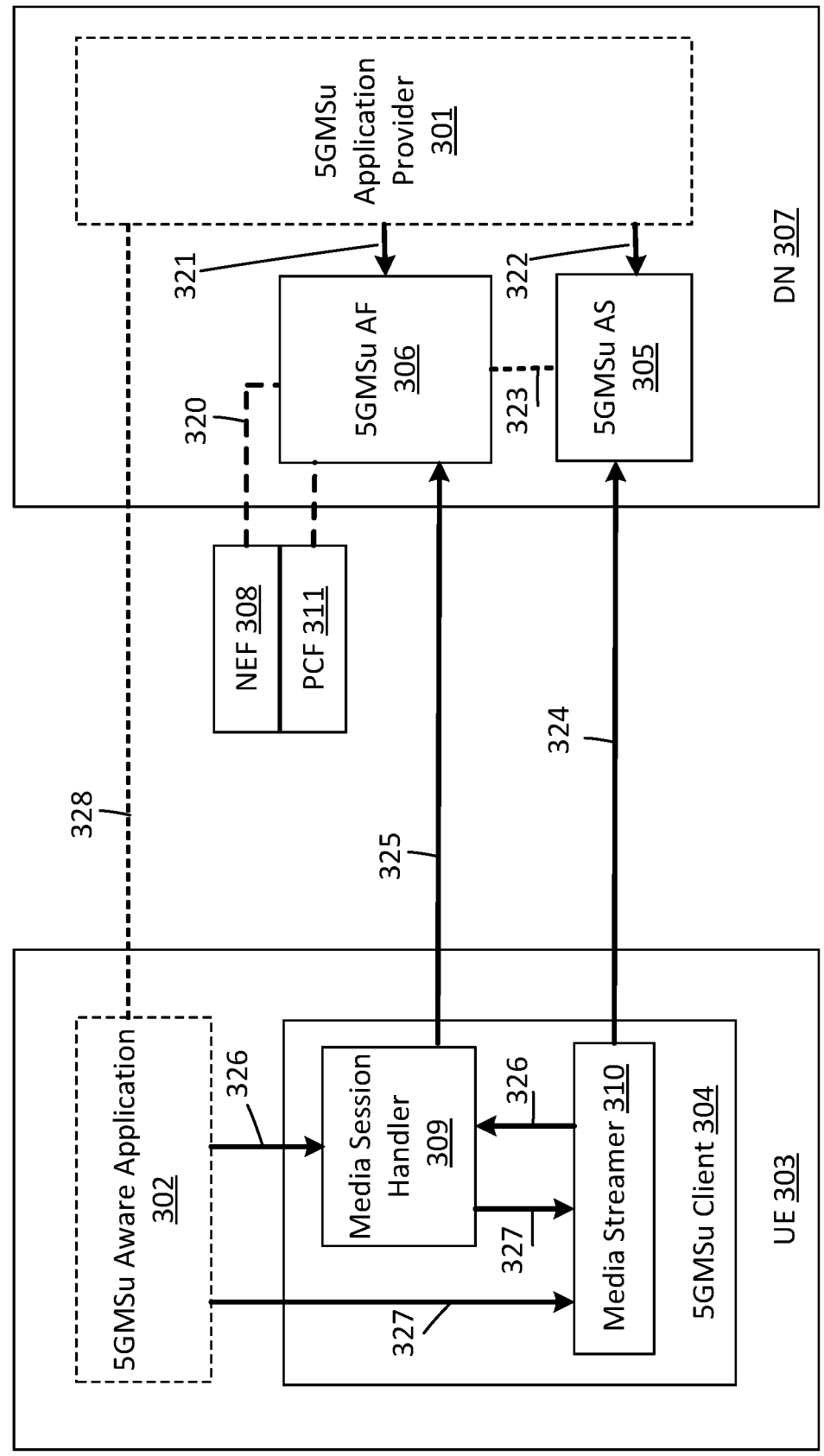
FIG. 3 is a diagram of a media architecture for media uplink streaming, according to embodiments.

FIG. 3 is a diagram of a media architecture 300 for media uplink streaming according to embodiments. A 5GMSu Application Provider 301 may use 5GMSu for uplink streaming services. In one or more examples, an uplink stream service may be a live video streaming session using a social medial platform. The 5GMSu Application Provider 301 may be implemented as a server. The 5GMSu Application Provider 301 may provide a 5GMSu Aware Application 302 on a UE 303 to make use of 5GMSu Client 304 and network functions using interfaces and APIs defined in 5GMSu. A 5GMSu application server (AS) 305 may be an AS dedicated to 5G Media Uplink Streaming. The 5GMSu Client 304 may be an internal function of the UE 303 dedicated to 5G Media Uplink Streaming.

A 5GMSu application function (AF) 306 and the 5GMSu AS 305 may be Data Network (DN) 307 functions. The 5GMSu AF 306 may be implemented as a server. Functions in trusted DNs may be trusted by the operator's network. Therefore, AFs in trusted DNs may directly communicate with some or all 5G Core functions. Functions in external DNs may only communicate with 5G Core functions via a network exposure function (NEF) 308 using link 320. The NEF 308 facilitates secure access to exposed network services and capabilities of the 5G network.

The media architecture 300 may connect UE 303 internal functions and related network functions for 5G Media Uplink Streaming. Accordingly, the media architecture 300 may include a number of functions. For example, the 5GMSu Client 304 on UE 303 may be an originator of a 5GMSu service that may be accessed through interfaces/APIs. The 5GMSu Client 304 may include two sub-functions, a Media Session Handler 309 and a Media Streamer 310. The Media Session Handler 309 may communicate with the 5GMSu AF 306 in order to establish, control and support the delivery of a media session. The Media Session Handler 309 may expose APIs that may be used by the 5GMSu Aware Application 302. The Media Streamer 310 may communicate with 5GMSu AS 305 to stream the media content and provide a service to the 5GMSu Aware Application 302 for media capturing and streaming, and the Media Session Handler 309 for media session control. The 5GMSu Aware Application 302 may control the 5GMSu Client 304 by implementing external application or content service provider specific logic and enabling the establishment of a media session. The 5GMSu AS 305 may host 5G media functions and may be implemented as a content delivery network (CDN), for example. The 5GMSu Application Provider 301 may be an external application or content specific media functionality (e.g., media storage, consumption, transcoding and redistribution) that uses 5GMSu to stream media from the 5GMSu Aware Application 302. The 5GMSu AF 306 may provide various control functions to the Media Session Handler 309 on the UE 303 and/or to the 5GMSu Application Provider 301. The 5GMSu AF 306 may relay or initiate a request for a different policy control function (PCF) 311 treatment or interact with other network functions.

The media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when the 5GMSu AS 305 in a trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by the 5GMSu AS 305 to the Media Streamer 310 to stream media content. Link 325 may relate to M5u, which may be a Media Session Handling API exposed by 5GMSu AF 305 to Media Session Handler for media session handling, control, and assistance that also include appropriate security mechanisms (e.g., authorization and authentication). Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to the 5GMSu Aware Application 302 and the Media Session Handler 309 to make use of the Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

The current 5G media streaming architecture only defines the general architecture for uplink and downlink media streaming. While the 5G media streaming architecture defines the general uplink process and a general concept of a remote-control option for controlling the uplink streaming, this architecture does not specify how the remote-control option may be used by another device, another app, or a process on the network.

Embodiments of the present disclosure are directed to provisioning of a third party remote control performed by the 5GMS Application Service Provider and 5GMS-Aware Application. In one or more embodiments, a protocol and command negotiation may be performed through the 5GMS Application Service Provider and 5GMS-Aware Application. In one or more embodiments, a remote control of the uplink streaming is performed through the 5GMS-Aware application.

Figure 4:
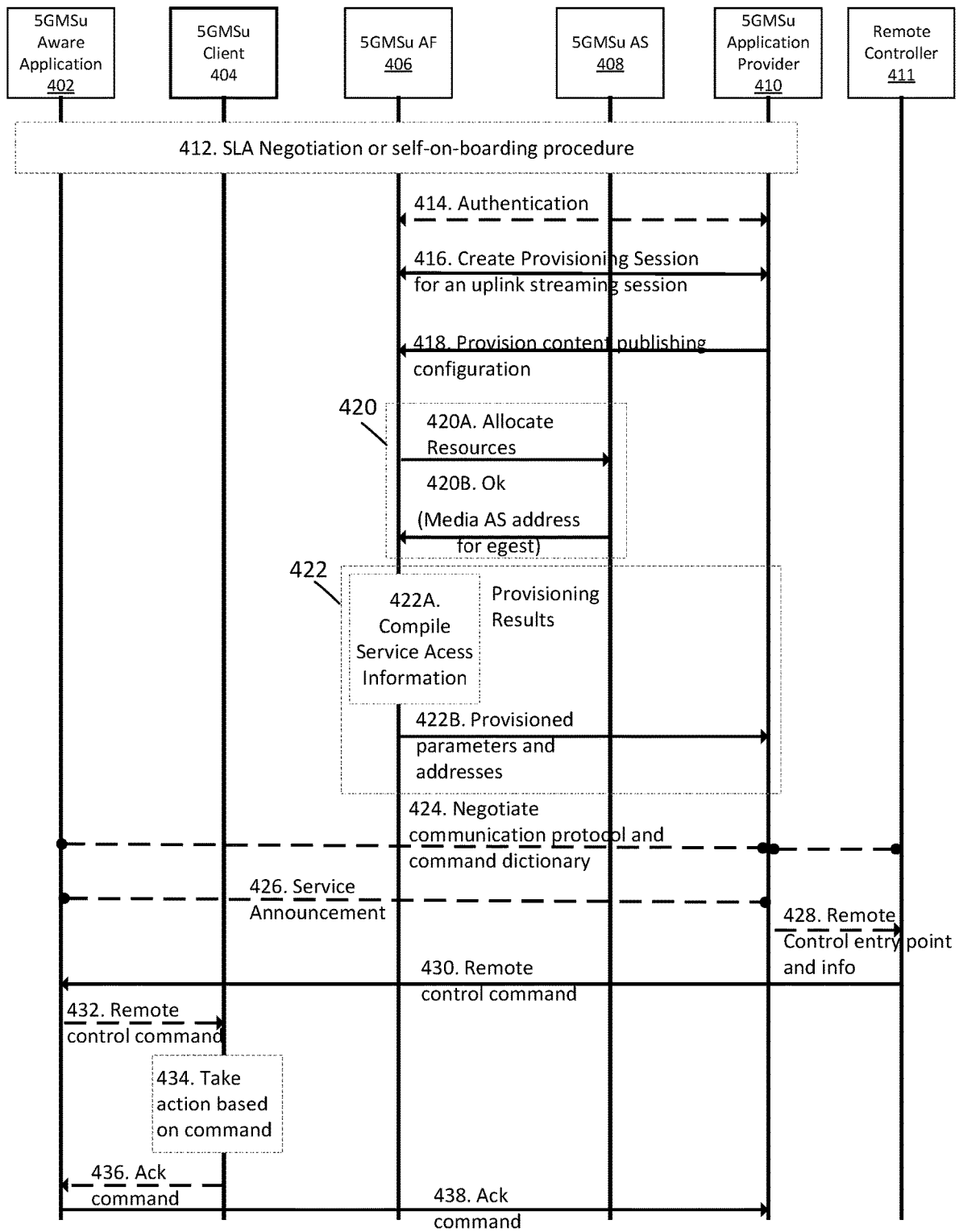
FIG. 4 is a diagram of an operation flow for remote control of a 5GMS uplink streaming session.

FIG. 4 is a diagram of an operation flow 400 for provisioning a 5GMS system for uplink streaming with a remote control option, according to embodiments. The operation flow may be performed between a 5GMSu Aware Application 402, a 5GMSu Client 404, a 5GMSu AF 406, a 5GMSU AS 408, a 5GMSu Application Provider 410, and a Remote Controller 411. The 5GMSu Aware Application 402 may correspond to the 5GMSu Aware Application 302 (FIG. 3). The 5GMSu Client 404 may correspond to the 5GMSu Client 304 (FIG. 3). The 5GMSu AF 406 may correspond to the 5GMSu AF 306 (FIG. 3). The 5GMSu AS 408 may correspond to the 5GMSu AS 305 (FIG. 3). The 5GMSu Application Provider 410 may correspond to the 5GMSu Application provider 301 (FIG. 3). The Remote Controller 411 may be any device known to one ordinary skill in that may function as a remote control such as a game controller, mobile phone, etc. In one or more examples, the remote controller may be an application on a UE or a network application in a trusted or external network.

In operation 412, an SLA Negotiation or self-on-boarding procedure may be performed. During this operation, the 5GMSu Application Provider 410 discovers an address (e.g., URL) of the 5GMSdu AF (M1u) for Session Provisioning.

In operation 414, the 5GMSu Application Provider 410 authenticates itself with the system. In one or more examples, authentication is performed between the 5GMSu Application Provider 410 and the 5GMSu AF 406. This procedure may reuse existing authentication/authorization procedures, for example, as defined for the Common API Framework (CAPIF).

In operation 416, the 5GMSu Application Provider 410 creates a Provisioning Session for an uplink streaming session. For example, in operation 416, the 5GMSu Application Provider 410 transmits a message to the 5GMSu AF 406 for establishing the Provisioning Session. This message may include an identifier of the 5GMSu Application Provider 410 identifier as input. In one or more examples, the 5GMSu Application Provider 410 queries the capabilities and authorized features.

In operation 418, the 5GMSu Application Provider 410 specifies one or more 5GMSu features in the Provisioning Session. In one or more examples, the 5GMSu Application provider 410 transmits a request or message to the 5GMSu AF 406 that specifies a selection of one or more 5GMSu features. Based on this request, a set of authorized features is activated, such as content dynamic policy features, a network assistance feature, and a content publishing feature including egest. In one or more examples, as part of content publish configuration provisioning, the 5GMSu Application Provider specifies that a remote-controlled option is selected. The protocol and characteristics of the remote control option may also be included in this provisioning request.

In one or more examples, when the content publishing feature is offered and selected as one of the 5GMSu features, the 5GMS Application Provider 410 may configure the content publishing behavior of the 5GMSu AS 408, including selecting an uplink ingest protocol and format, content preparation, and an egest protocol and format. In one or more examples, the content preparation feature enables the 5GMS Application Provider 410 to specify content manipulation by network-side components of the 5GMS System according to provisioned Content Preparation Templates. When the 5GMSu Application Provider 410 has provisioned the content preparation feature for uplink media streaming, network-side components of the 5GMS System may manipulate the media content ingested from the 5GMSu Client 404 in the UE, and may cache the manipulated content prior to egesting it to the 5GMSu Application Provider 410.

In one or more examples, when the dynamic policy feature is offered and selected as one of the 5GMSu features, the 5GMSu Application Provider 410 may specify a set of policies that may be invoked for the uplink streaming session. In one or more examples, the UE becomes aware of the selected policies in the form of a list of valid Policy Template Ids. In one or more examples, when the dynamic policy feature is activated, the 5GMSu Application Provider 410 may provision one or more policy templates.

In one or more examples, when the edge computing feature is offered and selected as one of the 5GMSu features, the 5GMSu Application Provider 410 may provide one or more Edge Resources Configurations that may be used to support either client-driven management or Application Provider-driven management of edge resources associated with the Provisioning Session.

In one or more examples, the network assistance feature enables the 5GMS Client in the UE to interrogate or manipulate a network Quality of Service for an ongoing media streaming session. For example, the network assistance feature enables a UE to receive a bit rate recommendation from the 5GMSu AF 406 providing a Network Assistance server function. The 5GMS AF 406 may use a Npcf_PolicyAuthorization notification or Nnef_MonitoringEvent procedure to receive notifications of network QoS changes (e.g., estimation of throughput, recommendation of a bit rate. The 5GMS AF 406 may receive these policy change notifications asynchronously.

In operation 420, when the content publication feature is selected, the 5GMSu AF 406 may perform operation 420A and interact with the 5GMSu AS 408 to allocate resources for the M2u egest protocol and format. Subsequently, in operation 420B, the 5GMSu AS 408 responds with the M2u address.

In operation 422, the 5GMSu AF 406 performs one or more provisioning operations. For example, in operation 422A, the 5GMSu AF 406 compiles Service Access Information. The Service Access Information may further include an M5u (Media Session Handling) address for an uplink entry point including the remote control option and the remote control protocol. The Service Access Information may further contain access details and options such as a Provisioning Session identifier, dynamic policy, network assistance, etc. In one or more examples, the Service Access Information may include a set of parameters and addresses that are needed by a 5GMS Client to activate the reception of a downlink media streaming session or the transmission on an uplink media streaming session, perform dynamic policy invocation, consumption reporting and/or metrics reporting, and request AF-based network assistance.

In operation 422B, provisioned parameters and addresses are provided to the 5GMSu Application Provider 410. For example, the 5GMSu AF 406 may provide the results of the compiled Service Access Information to the 5GMSu Application Provider 410. In one or more examples, when the 5GMSu Application Provider has selected full-Service Access Information, then the results are provided in the form of addresses and configurations for M2u (egest), M5u (Media Session Handling), M4u (Media Uplink Streaming), and one or more remote control parameters if needed. In one or more examples, when the 5GMSu Application Provider delegated the service access information handling to the 5GMS System, then a reference to the Service Access Information (e.g. an URL) is provided. The Media Session Handler 309 (FIG. 3) fetches the full-Service Access Information later from the 5GMSu AF.

In operation 424, the 5GMSu-Aware Application 402, the 5GMSu Application Provider 410 and the remote controller 411 (e.g., third party) negotiate on a remote control communication protocol and the command dictionary for remote control. In one or more examples, an agreement may be reached on a remote control communication protocol to be used transmission of one or more remote control commands. In one or more examples, an agreement may be reached on a command dictionary. The command dictionary may correlate one or more remote control features with one or more playback features associated with content of an uplink streaming session. For example, if a remote control has the buttons "A," "B," "C," and "D," the command dictionary may specify that the "A" button is correlated with a "Play" command, the "B" button is associated with a "Stop" command, the "C" button is associated with a "Fast Forward" command, and the "D" button is associated with a "Reverse" command.

In one or more examples, the negotiation process may be initiated by the 5GMSu Application Provider 410 transmitting a first message to the 5GMSu Aware Application 402 and a second message to the Remote Controller 411. In one or more examples, the first and second messages may specify the remote control communication protocol and command dictionary to be used during the uplink streaming session. In one or more examples, the first message may request the 5GMSu Aware Application 402 to provide compatible remote control communication protocols and command dictionaries, and the second message may request the Remote Controller 411 to provide compatible remote control communication protocols and command dictionaries. Based on the responses to the first and second messages, the 5GMSu Application Provider 410 may select a remote control communication protocol and command dictionary that is compatible with both the 5GMSu Aware Application 402 and the Remote Controller 411. The 5GMSu Application Provider 410 may further send additional messages to the 5GMSu Aware Application 402 and the Remote Controller 411 indicating the selection of the remote control communication protocol and the command dictionary.

In operation 426, the 5GMSu Application Provider executes Service Announcement and updates the UE including the remote control parameters. Operation 426 may be performed during the life time of the Provisioning Session. In one or more examples, the 5GMSu Application Provider 410 transmits a Service Announcement message to the 5GMSu Aware Application 402. In one or more examples, the Service Announcement may include providing the remote control entry point to the 5GMSu Aware Application 402. In one or more examples, the Service Announcement message may include the provisioned parameters and/or addresses received in operation 422B. The Service Announcement may further include the remote control communication protocol and command dictionary specified in operation 424.

In operation 428, the 5GMSu Application Provider 410 sends remote control information to the Remote Controller 411. The remote control information may include the remote control entry point. The remote control information may further include the remote control communication protocol and command dictionary specified in operation 424.

In operation 430, the 5GMSu Aware Application 402 may receive a remote control command from the Remote Controller 411. The remote control command may be received during an uplink streaming session in which content is uploaded to the 5GMSu AS 408. The remote control command may be associated with the playback of the content uploaded to the 5GMSu AS 408 such as "Play," "Stop," "Fast Forward," or "Reverse."

In operation 432, the 5GMSu Aware Application 402 may forward the remote control command to the 5GMSu Client 404. In one or more examples, the 5GMSu Aware Application 402 may transmit a message to the 5GMSu Client 404 that includes a copy of the remote control command received in operation 430.

In operation 434, the 5GMSu client 404 takes (e.g., performs) the required action based on the received remote control command. For example, during the uploading of content, the remote control command may specify a "Play" command, a "Stop" command, a "Fast Forward" command, or a "Reverse" command.

In operation 436, the 5GMSu client 404 acknowledges the command results to the 5GMSu Aware Application 402.

In operation 438, the 5GMSu Aware Application 402 acknowledges the command results to the Remote Controller 411.

Figure 5:
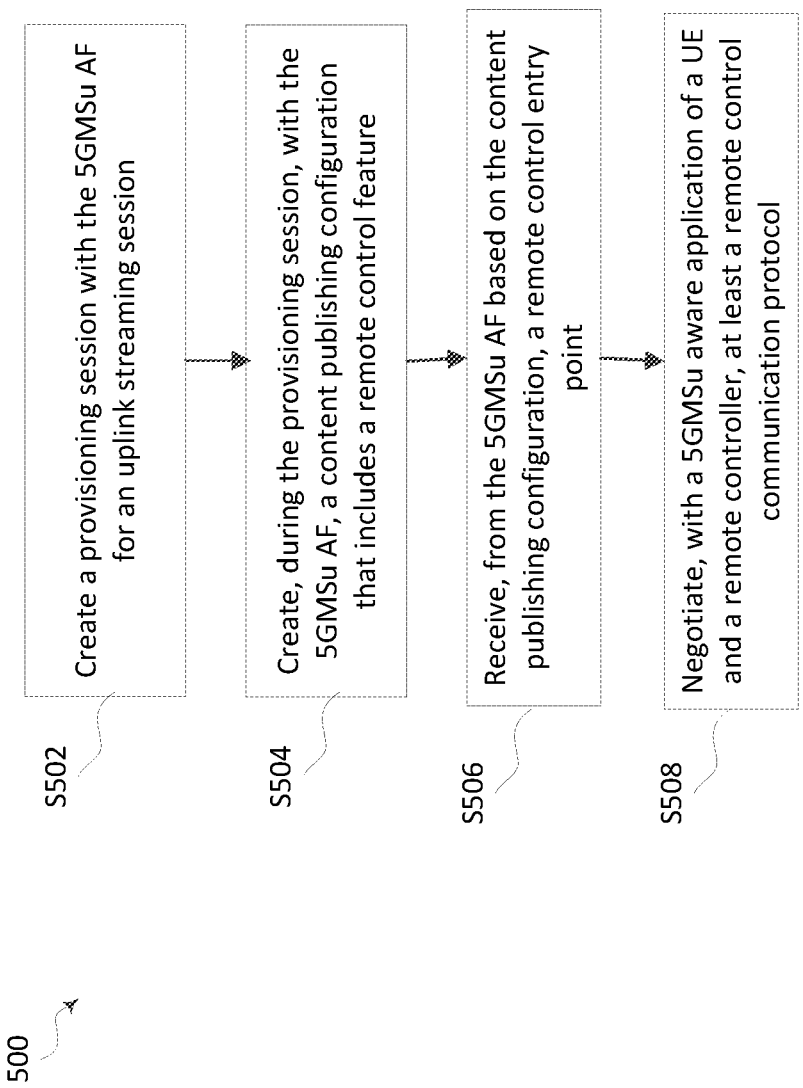
FIG. 5 is a flowchart of an example process performed by a 5GMSu application provider, according to embodiments.

FIG. 5 illustrates a flowchart of an example process 500 performed by a 5GMSu application provider such as 5GMSu Application Provider 410 (FIG. 4).

The process proceeds to operation S502 where a provisioning session with the 5GMSu AF for an uplink streaming session is created. For example, the 5GMSu Application Provider 410 creates a provisioning session with the 5GMSu AF 406 in accordance with operation 416 (FIG. 4).

The process proceeds to operation S504 where a content publishing configuration that includes a remote control feature is created with the 5GMSu AF during the provisioning session. For example, the 5GMSu Application Provider 410 transmits to the 5GMSu AF 406 a message that specifies a content publishing configuration with the remote control feature in accordance with operation 418.

The process proceeds to operation S506, where a remote control entry point is received from the 5GMSu AF based on the content publishing configuration. For example, the 5GMSu Application Provider 410 receives the remote control entry point from the 5GMSu AF 406 in accordance with operation 422B.

The process proceeds to operation S508, where a remote control communication protocol is negotiated with a 5GMSu Aware Application of a UE and a remote controller. For example, the 5GMSu Application Provider 410 may negotiate with the 5GMSu Aware Application 402 and the Remote Controller 411 a remote control communication protocol to be used during an uplink session in accordance with operation 424. The 5GMSu Application Provider 410 may further negotiate a command dictionary to be used during the uplink session.

Figure 6:
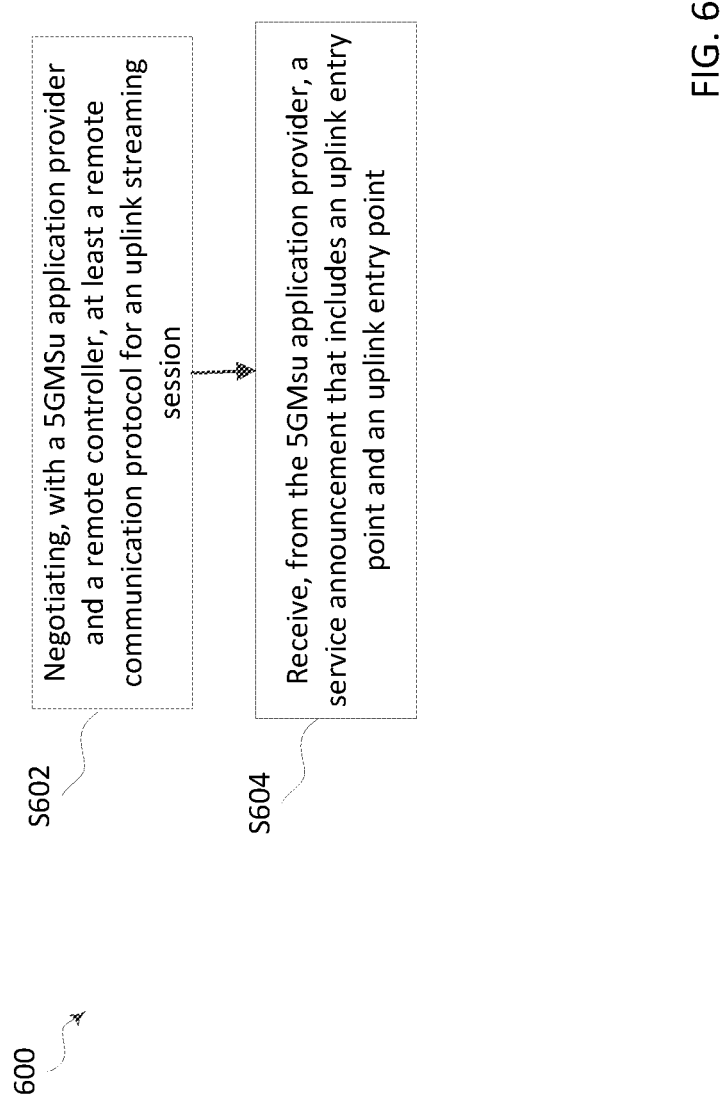
FIG. 6 is a flowchart of an example process performed by a 5GMSu aware application of a user equipment (UE), according to embodiments.

FIG. 6 illustrates a flowchart of an example process 600 performed by a 5GMSu Aware Application such as the 5GMSu Aware Application 402 (FIG. 4).

The process may start at operation S602 where a remote communication protocol for an uplink streaming session is negotiated between the 5GMSu Aware Application, a 5GMSu Application provider 410, and a Remote Controller 411. For example, a remote communication protocol may be negotiated in accordance with operation 418. Furthermore, a command dictionary may be negotiated.

The process proceeds to operation S604 where a service announcement is received from the 5GMSu Application provider. For example, the 5GMSu Aware Application 402 may receive a Service Announcement from the 5GMSu Application Provider 410 in accordance with operation 410. The Service Announcement may include a remote control entry point and an uplink entry point.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method performed by at least one processor in a 5G media streaming uplink (5GMSu) application provider (AP), comprising: negotiating, by a 5GMSu AP with a 5GMSu aware application of a user equipment (UE) and a third-party remote controller, at least a communication protocol and a command dictionary for remote control of a 5GMSu session; executing and updating, by the 5GMSu AP, the UE with a service announcement; and transmitting, by the 5GMSu AP, remote control information to the third party remote controller, in which the third-party remote controller sends a remote control command to the 5GMSu aware application in response to receiving the remote control information.

(2) The method according to feature 1, further comprising: creating a provisioning session with the 5GMSu application function (AF) for an uplink streaming session; creating, during the provisioning session with the 5GMSu AF, a content publishing configuration that includes a remote control feature; receiving, from the 5GMSu AF based on the content publishing configuration, a remote control entry point.

(3) The method according to feature (2), in which the remote control command dictionary correlates at least one operation of the remote controller with playback of uplink content associated with the 5GMSu session.
(4) The method of any one of features (1)-(3), in which the service announcement includes (i) an uplink entry point for uploading content to a 5GMSu application server (AS) during the 5GMSu session and (ii) a remote control entry point.
(5) The method according to feature (1)-(4), further comprising: transmitting, to a remote controller, the remote control entry point.
(6) The method according to any of features (1)-(5), in which a 5GMSu client of the UE performs an action based on the received remote control command, in which the 5GMSu client transmits an acknowledgment to the 5GMSu aware application indicating that the action has been performed, and in which the 5GMSu aware application transmits an acknowledgment to the third party remote controller indicating that the action has been performed.
(7) The method of any one of features (1)-(6), in which the 5GMSu AF compiles service access information that includes a provisioning session identifier and a M5u address for an uplink entry point.
(8) The method of feature (7), in which the 5GMSu AP receives the M5u address for the uplink entry point when the 5GMSu application provider has selected a full-Service Access Information feature, and in which the 5GMSu AP receives a reference to the M5u address for the uplink entry point when the 5GMSu application provider has selected a delegated service access information feature.
(9) The method of any one of features (1)-(8), in which when the 5GMSu AP selects a content publication feature, the 5GMSu AF interacts with a 5GMSu application server (AS) to allocate resources for a M2u egest protocol and format, and in which the 5GMSu AF receives a response from the 5GMSu AS that includes the M2u address.
(10) A method performed by a 5G media streaming uplink (5GMSu) aware application of a user equipment (UE), the method comprising: negotiating, with a 5GMSu application provider (AP) and a third-party remote controller, at least a communication protocol for an 5GMSu session and a command dictionary for remote control of the 5GMSu session; receiving, from the 5GMSu AP, a service announcement that includes remote control information; and receiving, from the third-party remote controller, a remote control command based on the remote control information.
(11) The method according to feature (10), in which the negotiating is performed according to a content publishing configuration specified by the 5GMSu AP during a provisioning session between the 5GMSu AP and a 5GMSu AF.
(12) The method according to feature 10, in which the remote control command dictionary correlates at least one operation of the remote controller with playback of uplink content associated with the 5GMSu session.
(13) The method according to feature (12), further comprising: forwarding the remote control command to a 5GMSu client of the UE.
(14) The method according to feature (13), further comprising: receiving, from the 5GMSu client, acknowledgment that an action corresponding to the remote control command is performed by the 5GMSu client; and forwarding, to the 5GMSu client, the acknowledgment received from the 5GMSu client.
(15) A 5G media streaming uplink (5GMSu) application provider (AP) server, comprising: at least one memory configured to store program code; and at least one processor configured to read the program code and operate as instructed by the program code, the program code including: negotiating code configured to cause the at least one processor to negotiate, with a 5GMSu aware application of a user equipment (UE) and a third-party remote controller, at least a communication protocol and a command dictionary for remote control of a 5GMSu session; executing code configured to cause the at least one processor to execute and update, the UE with a service announcement; and transmitting code configured to cause the at least one processor to transmit, remote control information to the third party remote controller, in which the third-party remote controller sends a remote control command to the 5GMSu aware application in response to receiving the remote control information.
(16) The 5GMSu application provider server according to feature (15), further comprising: first creating code configured to cause the at least one processor to create a provisioning session with the 5GMSu application function (AF) for an 5GMSu session; second creating code configured to cause the at least one processor to create, during the provisioning session with the 5GMSu AF, a content publishing configuration that includes a remote control feature; first receiving code configured to cause the at least one processor to receive, from the 5GMSu AF based on the content publishing configuration, a remote control entry point.
(17) The 5GMSu application provider server according to feature (16), in which the remote control command dictionary correlates at least one operation of the remote controller with playback of uplink content associated with the 5GMSu session.
(18) The 5GMSu application provider server of any one of features (15)-(17), in which the program code further comprises: transmitting code configured to cause the at least one processor to transmit, to the 5GMSu aware application in a user equipment (UE), a server announcement that includes (i) an uplink entry point for uploading content to a 5GMSu application server (AS) during the 5GMSu session and (ii) a remote control entry point.
(19) The 5GMSu application provider server according to any one of features (11)-(18), in which the service announcement further includes (i) an uplink entry point for uploading content to a 5GMSu application server (AS) during the 5GMSu session and (ii) a remote control entry point.
(20) A user equipment (UE) executing a 5G media streaming uplink (5GMSu) aware application, the UE comprising: at least one memory configured to store program code; and at least one processor configured to read the program code and operate as instructed by the program code, the program code including: negotiating code configured to cause the at least one processor to negotiate, with a 5GMSu application provider (AP) and a third-party remote controller, at least a remote communication protocol for an 5GMSu session a command dictionary for remote control of the 5GMSu session; first receiving code configured to cause the at least one processor to receive, from the 5GMSu AP, a service announcement that includes remote control information; and receiving, from the third-party remote controller, a remote control command based on the remote control information.

What is claimed is:

1. A method performed by at least one processor in a 5G media streaming uplink (5GMSu) application provider (AP), comprising:
    negotiating, by a 5GMSu AP with a 5GMSu aware application of a user equipment (UE) and a third-party remote controller, at least a communication protocol and a command dictionary for remote control of a 5GMSu session;
    executing and updating, by the 5GMSu AP, the UE with a service announcement; and
    transmitting, by the 5GMSu AP, remote control information to the third party remote controller, wherein the third-party remote controller sends a remote control command to the 5GMSu aware application in response to receiving the remote control information.

2. The method according to claim 1, further comprising:
    creating a provisioning session with the 5GMSu application function (AF) for an uplink streaming session;
    creating, during the provisioning session with the 5GMSu AF, a content publishing configuration that includes a remote control feature; and
    receiving, from the 5GMSu AF based on the content publishing configuration, a remote control entry point.

3. The method according to claim 2, wherein the remote control command dictionary correlates at least one operation of the remote controller with playback of uplink content associated with the 5GMSu session.

4. The method of claim 1, wherein the service announcement includes (i) an uplink entry point for uploading content to a 5GMSu application server (AS) during the 5GMSu session and (ii) a remote control entry point.

5. The method according to claim 1, further comprising:
    transmitting, to a remote controller, the remote control entry point.

6. The method according to claim 1, wherein a 5GMSu client of the UE performs an action based on the received remote control command, wherein the 5GMSu client transmits an acknowledgment to the 5GMSu aware application indicating that the action has been performed, and wherein the 5GMSu aware application transmits an acknowledgment to the third party remote controller indicating that the action has been performed.

7. The method of claim 1, wherein the 5GMSu AF compiles service access information that includes a provisioning session identifier and a M5u address for an uplink entry point.

8. The method of claim 7, wherein the 5GMSu AP receives the M5u address for the uplink entry point when the 5GMSu application provider has selected a full-Service Access Information feature, and wherein the 5GMSu AP receives a reference to the M5u address for the uplink entry point when the 5GMSu application provider has selected a delegated service access information feature.

9. The method of claim 1, wherein when the 5GMSu AP selects a content publication feature, the 5GMSu AF interacts with a 5GMSu application server (AS) to allocate resources for a M2u egest protocol and format, and wherein the 5GMSu AF receives a response from the 5GMSu AS that includes the M2u address.

10. A method performed by a 5G media streaming uplink (5GMSu) aware application of a user equipment (UE), the method comprising:
    negotiating, with a 5GMSu application provider (AP) and a third-party remote controller, at least a communication protocol for an 5GMSu session and a command dictionary for remote control of the 5GMSu session;
    receiving, from the 5GMSu AP, a service announcement that includes remote control information; and
    receiving, from the third-party remote controller, a remote control command based on the remote control information.

11. The method according to claim 10, wherein the negotiating is performed according to a content publishing configuration specified by the 5GMSu AP during a provisioning session between the 5GMSu AP and a 5GMSu AF.

12. The 5GMSu application provider server according to claim 11, wherein the service announcement further includes (i) an uplink entry point for uploading content to a 5GMSu application server (AS) during the 5GMSu session and (ii) a remote control entry point.

13. The method according to claim 10, wherein the remote control command dictionary correlates at least one operation of the remote controller with playback of uplink content associated with the 5GMSu session.

14. The method according to claim 13, further comprising:
    forwarding the remote control command to a 5GMSu client of the UE.

15. The method according to claim 14, further comprising:
    receiving, from the 5GMSu client, acknowledgment that an action corresponding to the remote control command is performed by the 5GMSu client; and
    forwarding, to the 5GMSu client, the acknowledgment received from the 5GMSu client.

16. A 5G media streaming uplink (5GMSu) application provider (AP) server, comprising:
    at least one memory configured to store program code; and
    at least one processor configured to read the program code and operate as instructed by the program code, the program code including:
        negotiating code configured to cause the at least one processor to negotiate, with a 5GMSu aware application of a user equipment (UE) and a third-party remote controller, at least a communication protocol and a command dictionary for remote control of a 5GMSu session;
        executing code configured to cause the at least one processor to execute and update, the UE with a service announcement; and
        transmitting code configured to cause the at least one processor to transmit, remote control information to the third party remote controller, wherein the third-party remote controller sends a remote control command to the 5GMSu aware application in response to receiving the remote control information.

17. The 5GMSu application provider server according to claim 16, further comprising:
    first creating code configured to cause the at least one processor to create a provisioning session with the 5GMSu application function (AF) for an 5GMSu session;
    second creating code configured to cause the at least one processor to create, during the provisioning session with the 5GMSu AF, a content publishing configuration that includes a remote control feature;

first receiving code configured to cause the at least one processor to receive, from the 5GMSu AF based on the content publishing configuration, a remote control entry point.

18. The 5GMSu application provider server according to claim 15, wherein the remote control command dictionary correlates at least one operation of the remote controller with playback of uplink content associated with the 5GMSu session.

19. The 5GMSu application provider server of claim 16, wherein the program code further comprises:
transmitting code configured to cause the at least one processor to transmit, to the 5GMSu aware application in a user equipment (UE), a server announcement that includes (i) an uplink entry point for uploading content to a 5GMSu application server (AS) during the 5GMSu session and (ii) a remote control entry point.

20. A user equipment (UE) executing a 5G media streaming uplink (5GMSu) aware application, the UE comprising:
at least one memory configured to store program code; and
at least one processor configured to read the program code and operate as instructed by the program code, the program code including:
negotiating code configured to cause the at least one processor to negotiate, with a 5GMSu application provider (AP) and a third-party remote controller, at least a remote communication protocol for an 5GMSu session a command dictionary for remote control of the 5GMSu session;
first receiving code configured to cause the at least one processor to receive, from the 5GMSu AP, a service announcement that includes remote control information; and
receiving, from the third-party remote controller, a remote control command based on the remote control information.

* * * * *